Patented May 2, 1939

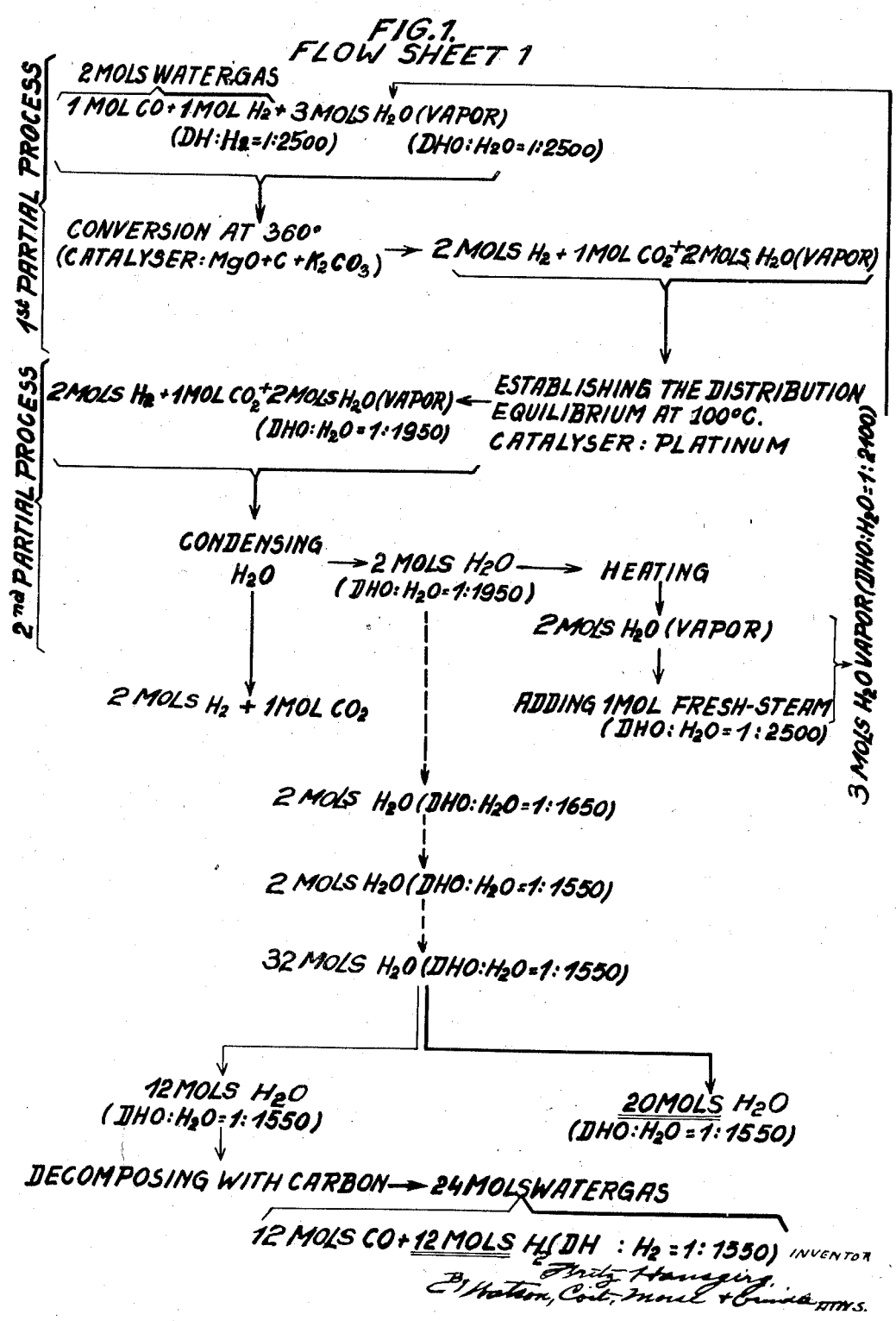

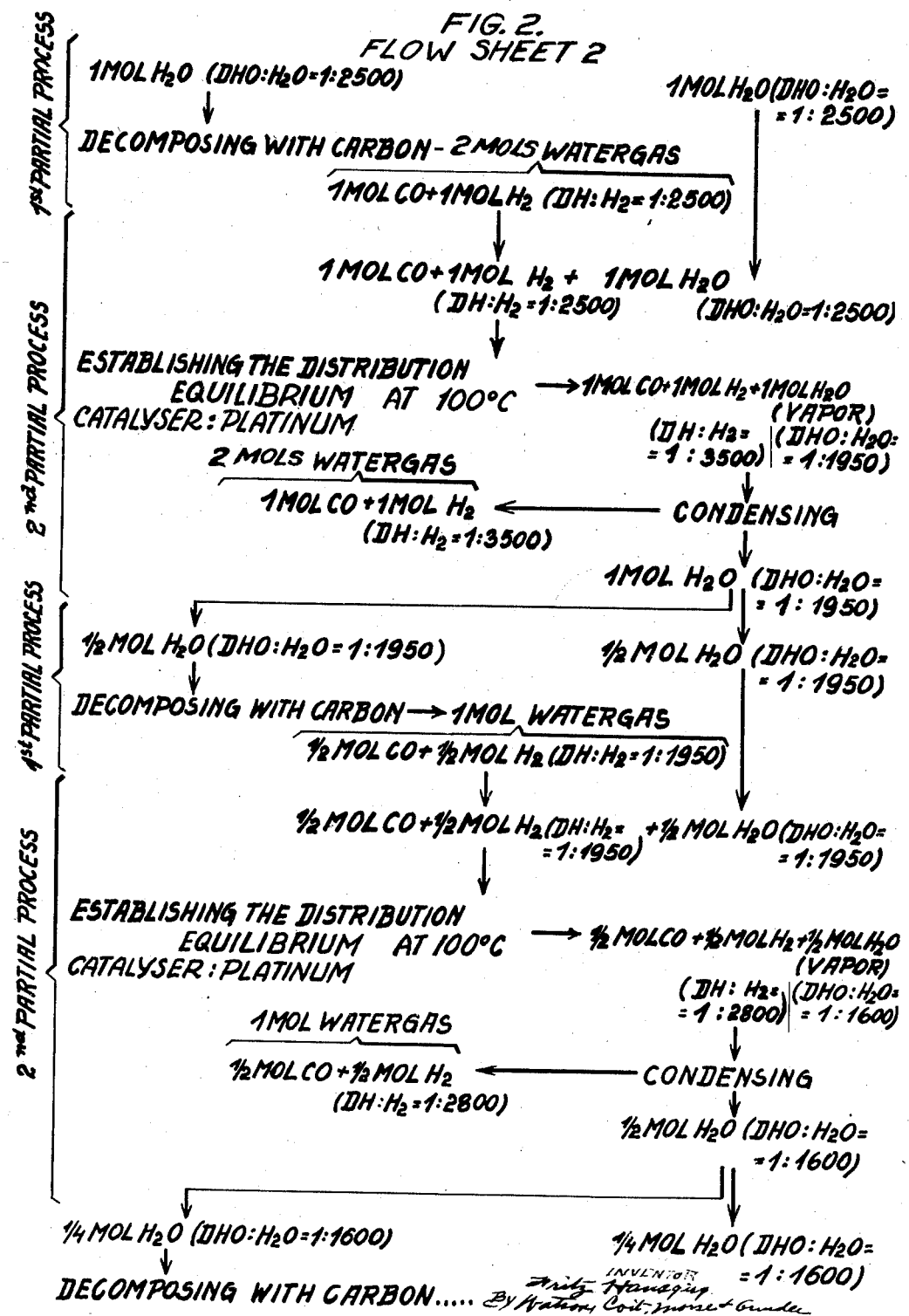

2,156,851

UNITED STATES PATENT OFFICE 2,156,851

PRODUCTION OF HEAVY WATER

Fritz Hansgirg, Konan, Korea

Application November 10, 1936, Serial No. 110,193
In Austria December 23, 1935

5 Claims. (Cl. 23—204)

The present invention relates to the production of heavy water particularly in the course of the production of hydrogen or of gaseous mixtures containing hydrogen.

The subject matter of my co-pending application Serial No. 52,707, filed December 3, 1935, is a process for the production of water enriched with heavy water by causing reactions which yield hydrogen gas by the reduction of water, and which proceed (if desired with catalytical acceleration) to equilibrium or approximately to equilibrium, to take place at as low temperatures as possible, and repeatedly returning into the reaction the water enriched with deuterium hydroxide and deuterium oxide remaining at the end of the reaction. It is the endeavour to effect the reduction of the water at as low temperatures as possible because the passing over of deuterium from hydrogen into water or water vapor proceeds in accordance with an equilibrium reaction in which the equilibrium is dependent on temperature in such a manner that as the temperature falls the enriching of water with the deuterium compounds is favored. A limit is set, however, to this endeavour by the fact that below a certain temperature, which is dependent on the catalyser used, the reduction of water does not proceed with sufficient velocity.

The process according to the present invention for the production of heavy water in the course of the generation of hydrogen or gaseous mixtures containing hydrogen by the reduction of water consists essentially in carrying out the reduction of water to hydrogen or hydrogen-containing gaseous mixtures and effecting an enrichment of water with deuterium compounds by contact of the hydrogen with water, if desired in the presence of catalyzers, in two partial processes which are regulated independently of each other as regards the reaction conditions, the water enriched with deuterium compounds being returned wholly or in part into the first partial process (reduction process), and deuterium being withdrawn in the second partial process, by means of natural water or water already enriched with deuterium compounds, from the hydrogen enriched with deuterium and obtained in this manner. A very considerable advance in various directions is made by carrying out the process for the production of heavy water in two indepedently regulated partial processes of which the one is governed by the conditions of the reduction process, while the other is governed by the conditions under which deuterium passes over from hydrogen into water or from hydrogen enriched with deuterium into natural water or into water enriched with deuterium compounds.

Thus, a primary advantage of this process is that a higher degree of enriching water with heavy water may be obtained by virtue of the possibility of establishing the distribution equilibrium of deuterium between hydrogen and water, (e. g. according to the equation

$$DH+H_2O \rightleftarrows DHO+H_2)$$

independently of the conditions of the reduction process, at far lower temperatures and with the aid of catalysers which are optimal precisely for this equilibrium adjustment. At the same time the process according to the present invention also affords the possibility of extending the range of the processes for the generation of hydrogen or hydrogen-containing gaseous mixtures which are applicable for the production of heavy water. The process according to the present invention thus admits of the obtaining of heavy water with the aid of reduction processes requiring temperatures that are so high that the distribution equilibrium of deuterium between hydrogen and water would be extremely unfavorable for enriching water with the heavy isotope, so that in fact no enriching would take place at all at these temperatures.

Moreover, it becomes possible in this manner to obtain water enriched with deuterium compounds without (in contradistinction to the process according to my said co-pending application) this water having to be present at the reduction itself as a component of the equilibrium system. It is thus possible to effect the production of heavy water not only in the course of reduction processes in which the reaction mixture contains appreciable amounts of water vapor in addition to hydrogen, as is the case for example in the conversion of carbon monoxide with steam to hydrogen and carbon dioxide, but also in the course of reduction processes in which the water present is completely decomposed. An example of a process of this latter nature is the generation of water gas by the decomposition of water in contact with carbon.

Of course, the process comprising both the above-mentioned partial processes or phases may be repeated any number of times. In this manner it is possible to obtain not only water very rich in deuterium compounds, but also, given a sufficiently large number of repetitions of the process, even pure deuterium oxide. To achieve this result it is necessary to avoid constantly repeated dilution of the enriched water on returning the same into the reduction process. For this reason the procedure is to collect water which has already been enriched to a certain extent with deuterium compounds until a sufficient quantity thereof is available to make it possible, in a subsequent step of the reduction process, to introduce this enriched water into the reduction without the addition of fresh water or less enriched water.

In the production of heavy water in the course of hydrogen generation by the conversion with steam of carbon monoxide in admixture with hydrogen, for instance by the conversion of water gas with steam, when proceeding constantly from water gas produced from natural water, there would occur a constantly repeated impoverishment of the deuterium compound content of the enriched water returned into the reduction process, since the already enriched water comes in contact at each stage of the reduction process with the hydrogen of the water gas, which contains the natural proportion of heavy isotope. Since the distribution of the deuterium between hydrogen and water depends on the concentration of the deuterium and its compounds in the two substances a passing over of deuterium from the water into the hydrogen would take place from a certain concentration (depending on the conditions under which the equilibrium is established) onwards.

Water may be enriched with deuterium compounds to a higher degree than that corresponding to this concentration limit, in accordance with a special mode of carrying out the invention, while using water gas comprising hydrogen enriched with deuterium; for instance the procedure may be such that only a part of the enriched water is introduced in the form of water vapor into the reaction, and a further portion is decomposed in contact with carbon to hydrogen and carbon monoxide, there being thereby obtained hydrogen enriched with deuterium, which constitutes a component of the equilibrium in the reduction process.

If, in accordance with a particular mode of practicing the invention, hydrogen and water, or hydrogen enriched with deuterium and water enriched with deuterium compounds, of the same isotopic composition be brought in contact with each other at each stage of the process the result is secured that an enrichment of the water with deuterium compounds actually takes place at each stage of the process, irrespective of what reduction process be employed or of the particular conditions under which such process be conducted.

The above mentioned disadvantage which occurs when proceeding constantly from water gas produced from natural water is also met with in the process of producing water enriched with heavy water according to my said prior application. A feature of the present invention consists therefore also in carrying out my said prior process while proceeding at a certain stage of the conversion reaction, from CO in admixture with hydrogen enriched with deuterium. Therefore, when working according to that prior process in accordance with the present invention only part of the enriched water may be returned into the reaction, in the form of water vapor, and a further part may be decomposed with carbon to carbon monoxide and hydrogen enriched with deuterium, the water gas thus obtained being converted with water enriched with deuterium compounds for the purpose of obtaining water with a higher degree of enrichment with deuterium compounds.

As catalyzers for establishing the distribution equilibrium of deuterium between hydrogen and water there may be employed for example the metals of the nickel and platinum group (platinum preferably in the form of platinum-black). Moreover, the establishing of this equilibrium is also accelerated by the catalyzers which catalyze the conversion of carbon monoxide with steam, that is to say for example by catalyzers of the iron group, e. g. iron oxide catalysts activated with chromium, or alternatively by a mixture of magnesium oxide and carbon or of magnesium oxide, carbon, and potassium carbonate. Chromium oxide and zinc oxide are also suitable catalyzers for the present purpose.

The establishing of the distribution equilibrium in the second partial process is preferably carried out at the lowest temperatures at which the passing over of deuterium from the hydrogen into the water, with the air of the catalyzers selected for use, still takes place with practically useful velocity. The temperature at which this equilibrium is established may even be below 100° C. Since in this case the water is present in a liquid state it is necessary to ensure intimate commixture of the water with the hydrogen and intimate contact with the catalyzers, which may be effected by appropriately constructing the apparatus in a manner known per se.

In order to obtain as thorough utilization as possible of the deuterium content of the enriched hydrogen in a later stage of the process deuterium may be withdrawn from this hydrogen by successively contacting it with water which at each subsequent contacting step has a lower deuterium compound concentration than in the preceding contacting step. For this purpose hydrogen taken from a later stage of the process is brought in contact, in the presence of catalyzers, at the low temperatures favorable to the establishing of equilibrium, with water derived from an earlier stage of the process, before this water is returned into the reduction process.

If the production of heavy water be carried out, as already described, in the course of the conversion of water gas with water vapor the procedure may be as follows, with the view of thoroughly utilizing the deuterium content of the enriched hydrogen:

The water gas conversion is effected in a plurality of stages, in such a manner that in the first stage only a part, and in each following stage a further part of the carbon monoxide is converted. The first stage is preferably carried out at the highest temperature, and each subsequent stage at a progressively lower temperature. At the same time the water vapor which effects the conversion of the carbon monoxide is conducted in countercurrent to the water gas or the reaction gases obtained as the result of the conversion, in such a manner that in the final stage the gas which has become converted to the greatest extent is brought in contact with the water vapor poorest in deuterium compounds, and in the first stage the not yet converted gas in brought in contact with the water vapor richest in deuterium compounds, so that the degree of enrichment with deuterium compounds of the water vapor conducted in countercurrent to the gaseous mixture increases from stage to stage. There is employed an excess of water which may be collected in the individual stages. The excess water may be re-introduced as often as desired in the form of vapor into the stages through which it has already passed.

To utilize in the simplest possible manner the deuterium content of hydrogen which is already highly enriched this hydrogen may also be combusted and the resulting water used as such or, if desired, returned into the reduction process. If desired, the enriched hydrogen may, of course, itself be employed as heavy hydrogen.

Both the reduction reaction (first partial process) and also the establishing of the distribution equilibrium of deuterium in hydrogen and water in the second partial process may be carried out under increased pressure.

EXAMPLES

I

*Production of heavy water in the course of the conversion of water gas with water vapor ($CO+H_2O=CO_2+H_2$)*

In Fig. 1 of the drawings (flow sheet 1) there is shown a graphic representation of the first section of the mode of carrying out the process described below.

The first partial process consists in the known conversion of carbon monoxide contained in water gas, with water vapor, to yield hydrogen and carbon dioxide. This conversion may be carried out in known manner. As catalyzer there serves for example a mixture of caustic burned magnesia, finely ground calcined potassium carbonate, and wood charcoal in which the proportion of the magnesia and of the potassium carbonate amounts to 15% each, and that of the wood charcoal to 70%. The temperature at which the establishment of the equilibrium of the conversion reaction is effected is say 360° C.

In this partial process 2 mols of water gas, consisting of 1 mol of CO and 1 mol of $H_2$, are converted with 3 mols of water vapor. The hydrogen contained in the water gas possesses the natural deuterium content, the proportion of DH to $H_2$ being as 1:2500, and the water likewise has the natural heavy isotope content $DHO:H_2O=1:2500$. After the carrying out of the conversion there is obtained a gaseous mixture consisting of hydrogen, carbon dioxide, water vapor, and having a slight (about 2 to 3%) residual carbon monoxide content. Since in the conversion reaction 1 mol of water vapor is reduced by 1 mol of CO the reaction mixture, after the carrying out of the conversion, consists of 2 mols of $H_2$, 1 mol of $CO_2$, and 2 mols of water vapor (provided the slight CO content be neglected as immaterial).

In the second partial process the gaseous mixture obtained in the first partial process is conducted into a contact vessel charged with platinum black, which is maintained at a temperature of slightly above 100° C. The gaseous mixture is left for some time in this vessel, so that the equilibrium of the heavy isotope in hydrogen and water vapor corresponding to this temperature becomes established. In this way the water vapor is brought to a heavy isotope content of $DHO:H_2O=1:1950$. The gaseous mixture is then thoroughly cooled, so that the whole of the water vapor present condenses. The gaseous mixture remaining after condensation and consisting of $H_2$ and $CO_2$ is then available for its intended purpose.

The two mols of enriched water having a deuterium content of $DHO:H_2O=1:1950$ obtained in this manner are then evaporated, and, after dilution with one mol of fresh steam $$DHO:H_2O=1:2500$$

returned into the conversion reaction. The water gas which is converted with these three mols of water vapor (with a heavy isotope content of $DHO:H_2O=1:2100$) again consists of one mol of CO and one mol of $H_2$ having a natural deuterium content of $DH:H_2=1:2500$. Partial process 1 and partial process 2 are again carried out in the described manner. The two mols of water obtained after completion of the second partial process have a heavy isotope content of $$DHO:H_2O=1:1650$$

These two mols of water are returned, in the form of vapor, into the conversion process, again diluted with one mol of fresh vapor. The two partial processes are carried out a third time. In this manner there are obtained, at the end of the second partial process, two mols of water of which the deuterium content is $$DHO:H_2O=1:1550$$

After say 32 mols of water ($DHO:H_2O=1:1550$) have been obtained in this manner the process is continued as follows:

Of the 32 mols of water of the composition $DHO:H_2O=1:1550$ thus obtained 12 mols are decomposed in contact with carbon, there being thereby obtained 24 mols of water gas consisting of 12 mols of CO and 12 mols of $H_2$ having a deuterium content of $DH:H_2=1:1550$. This stock of 24 mols of water gas and the remaining 20 mols of enriched water is employed for the further treatment which consists in repeating the partial processes 1 and 2 three times in the above described manner, there being now employed as starting material two mols of water gas composed of 1 mol of CO and 1 mol of $H_2$ $$(DH:H_2=1:1550)$$

and three mols of the water with a deuterium content of $DHO:H_2O=1:1550$. The diluting of the two mols of enriched water obtained after the first and second repetitions of the second partial process is likewise effected with water taken from the stock of water with a deuterium content of $DHO:H_2O=1:1550$. For carrying out the partial processes 1 and 2 three times there are thus required 6 mols of water gas (3 mols of $CO+3$ mols of $H_2$) and 5 mols of water from the collected stock. After the carrying out of this stage of the process there are obtained 2 mols of water having a deuterium content of $$DHO:H_2O=1:1000$$

These two mols of enriched water are collected.

After having carried out this section of the process four times the stock of water $$(DHO:H_2O=1:1550)$$

and of water gas ($DH:H_2=1:1550$ is used up, and there are obtained 8 mols of water having a heavy isotope content of 1:1000.

Three mols of this water are discomposed to water gas, with the result that there are obtained 6 mols of water gas consisting of 3 mols of $CO+3$ mols of $H_2$ ($DH:H_2=1:1000$). This water gas and the remaining 5 mols of water $$(DHO:H_2O=1:1000)$$

are employed in the next section of the process.

In this section of the process, which is carried out in the same manner as the first two sections of the process, there are obtained, after having carried out the two partial processes 1 and 2 three times, two mols of water of a heavy isotope content of 1:650.

If it is desired to carry the enriching further there is first produced in the manner specified a larger quantity of water of a degree of enrichment represented by the ratio 1:650, and, after partial decomposition of this water to water gas, the procedure is repeated in the manner described above.

Instead of proceeding in the above described manner the procedure may also be to avoid diluting or impoverishing of already enriched water with water and/or hydrogen of a lower degree of enrichment. For this purpose it is necessary first to produce water of the first enriching stage in a sufficiently large quantity, then to decompose part of the same, and in the next stage of the process to employ only the water gas obtained by this decomposition and the water remaining over from the first stage of the process. The same procedure must be adopted in each succeeding stage of the process.

When working on a large scale a multiple of the quantities given in this example will be worked up.

II

*Production of heavy water in the course of the generation of water gas*

Fig. 2 of the drawings (flow sheet 2) is a diagrammatic representation of the form of the process described below.

In the first partial process 1 mol of water of the natural heavy isotope content of $$DHO:H_2O=1:2500$$

(when working on a technical scale a multiple of this quantity) is decomposed in a known manner in contact with carbon at a temperature in excess of 1000° C., there being thereby obtained 2 mols of water gas consisting substantially of 1 mol of carbon monoxide and 1 mol of hydrogen of a deuterium content of $DH:H_2=1:2500$. In the second partial process this water gas is conducted, together with 1 mol of water vapor of the natural heavy isotope content of $DHO:H_2O=1:2500$, into a contact vessel charged with platinum black, the temperature of which is kept slightly above 100° C. The gaseous mixture is there left to itself for a time, in the course of which the distribution equilibrium of deuterium between hydrogen and water vapor becomes established. The gaseous mixture is then conducted into a cooler and thoroughly cooled, so that the whole of the water vapor condenses. There is obtained in this manner 1 mol of water of the composition $DHO:H_2O=1:1950$. The 2 mols of water gas escaping from the cooler consist of 1 mol of CO and 1 mol of $H_2$ of the composition $$DH:H_2=1:3500.$$

Half a mol of the water ($DHO:H_2O=1:1950$) obtained in the described manner is once more decomposed in contact with carbon in the first partial process, and the water gas thus formed (½ mol of CO+½ mol of $H_2$ of a deuterium content of $DH:H_2=1:1950$) brought in contact, in the second partial process, with the remaining half mol of the water of a heavy isotope content of $DHO:H_2O=1:1950$. In this manner there is obtained ½ mol of water of the composition $DHO:H_2O=1:1600$. The water gas (1 mol) proceeding from this stage of the process consists of ½ mol of CO and ½ mol of $H_2$ of a deuterium content of $DH:H_2=1:2800$.

The process is continued in the described manner, one half of the enriched water obtained in one stage of the process being employed each time for water gas generation in the first partial process, while the other half is brought in contact with this water gas in the second partial process.

After the third carrying out of the partial processes 1 and 2, which is not completely shown in the drawings, there has been obtained:

¼ mol of water ($DHO:H_2O=1:1300$)
½ mol of water gas consisting of ¼ mol of CO+¼ mol of $H_2$ ($DH:H_2=1:2150$);

after the fourth carrying out of the partial processes 1 and 2 there has been obtained:

⅛ mol of water ($DHO:H_2O=1:1100$)
¼ mol of water gas consisting of ⅛ mol of CO+⅛ mol of $H_2$ ($DH:H_2=1:1800$);

after the fifth carrying out of the partial processes 1 and 2 there has been obtained:

$\tfrac{1}{16}$ mol of water ($DHO:H_2O=1:850$)
⅛ mol of water gas consisting of $\tfrac{1}{16}$ mol of CO+$\tfrac{1}{16}$ mol of $H_2$ ($DH:H_2=1:1550$);

after the sixth carrying out of the partial processes 1 and 2 there will have been obtained:

$\tfrac{1}{32}$ mol of water ($DHO:H_2O=1:650$)
$\tfrac{1}{16}$ mol of water gas consisting of $\tfrac{1}{32}$ mol of CO+$\tfrac{1}{32}$ mol of $H_2$ ($DH:H_2=1:1200$)

It is possible to continue in the described manner until water of any desired degree of enrichment is obtained. It goes without saying that in each stage of the process so much enriched water is collected that its quantity corresponds to the size of the apparatus in which the water gas generation and the contacting of the water gas with water vapor are effected.

With this form of the process the water and hydrogen, which are brought into contact with each other in the second partial process in each stage, always have the same isotopic composition. Diluting of the already enriched water is here avoided altogether. The process may, however, be so carried out that diluting of the enriched water is effected, up to a certain point, in certain stages or in a series of stages which may, if desired, be consecutive stages.

As will be seen, the water gas obtained after the third carrying out of the two partial processes contains hydrogen the deuterium content of which is represented by the ratio 1:2150, and which is thus richer in deuterium than natural hydrogen. Deuterium can be withdrawn from this hydrogen by contact with natural water vapor, and such withdrawal may be effected in the contact vessel provided for the carrying out of partial process 2, at temperatures slightly above 100° C. The succeeding stages yield water gas the hydrogen of which becomes progressively richer in deuterium. Deuterium may be withdrawn from this hydrogen by successively contacting it with water or water vapor, the water vapor brought into contact with the hydrogen being of lower deuterium compound concentration in each of the following successive steps than in the preceding.

It will be clear that the production of heavy water or heavy hydrogen in the course of the conversion of water gas with water vapor to hydrogen and carbon dioxide may be combined in a suitable manner with the production of heavy water or heavy hydrogen in the course of water gas generation.

When using certain catalysers, such as for example nickel catalysers, it is desirable to prevent carbon monoxide from coming in contact with these catalysers, since this gas is capable of acting as a catalyst poisoner. In this case there will always be produced in the first partial process hydrogen which is free from carbon monoxide, and deuterium withdrawn from this hydrogen in the second partial process by contact with water.

It may be advisable, with the process according to the invention, to proceed from water which is already enriched up to a certain percentage with deuterium compounds by electrolysis, and/or to carry the enriching by the process according to the present invention only up to a certain point, and then to still further enrich by electrolysis the enriched water thus obtained.

In carrying out the process according to the present invention it is also possible to obtain as a by-product water which is poorer in deuterium compounds than natural water, by oxidizing to water the hydrogen impoverished of deuterium obtained in carrying out the described process. For example, by combusting the hydrogen obtained in the first cycle of the process described in Example II there is obtained water of the composition $DHO:H_2O=1:3500$. If this water impoverished of deuterium compounds be further brought in contact with hydrogen impoverished of deuterium, for example with hydrogen of the same isotopic composition $(DH:H_2=1:3500)$, under conditions favorable for the passing over of deuterium from hydrogen into water, there is obtained hydrogen which is still further impoverished of deuterium. By repeating sufficiently often the oxidation of part of the impoverished hydrogen to water and the contacting of the remaining hydrogen with the impoverished water obtained in this manner it is possible to arrive at water which is free from deuterium compounds. With this process it is also possible to proceed from hydrogen obtained in any other manner, and to bring this hydrogen in contact with natural water or water already impoverished of deuterium compounds. It is likewise a characteristic feature of this process that two independently regulated partial processes are employed, namely the oxidation of the hydrogen to water and the impoverishing process. This process may therefore be said to be a reversal of the described process for obtaining heavy water.

Instead of employing the generation of hydrogen or hydrogen-containing gaseous mixtures by the reduction of water for the production of heavy water it is also possible to proceed from reactions in which water is converted to compounds which contain bound hydrogen and deuterium, and from which deuterium may be withdrawn by contact with water. The process is analogous to that described for the production of heavy water in the course of the generation of hydrogen, only that the hydrogen is replaced by compounds which contain hydrogen and deuterium. As an example of such processes there may be named the production of acetylene by the decomposition of calcium carbide with water, which proceeds according to the following formula:

$$CaC_2 + 2H_2O = Ca(OH)_2 + C_2H_2$$

If equilibrium be established between natural water, preferably in the presence of alkali, and acetylene generated with the employment of natural water deuterium passes over from the acetylene into the water. The enriched water obtained in this manner is then again wholly or in part decomposed with calcium carbide, and deuterium withdrawn from the acetylene enriched with deuterium obtained in this manner, by contact with natural water or water already enriched with deuterium, and so on.

Finally, it is also possible in accordance with the invention to produce other deuterium compounds than the oxide, or to enrich other hydrogen compounds than water with chemically combined deuterium. For this purpose a reaction other than the reduction of water to hydrogen or hydrogen-containing gaseous mixtures is caused to proceed (first partial process), which yields a reaction product capable of giving off deuterium on to a starting product of the reaction, and there is combined therewith an independently regulated partial process which serves to enrich the starting product with chemically combined deuterium by contact with the reaction product. The starting substance enriched in this manner with chemically combined deuterium is returned wholly or in part into the first partial process, and deuterium again withdrawn from the reaction product obtained in this manner, by contact with the starting material or the starting material enriched with chemically combined deuterium. The said steps may be repeated until starting material with the desired degree of enrichment with chemically combined deuterium is obtained.

In the following claims I use the term "hydrogen" to include hydrogen, and hydrogen containing gas mixtures. The term "water" is used in the following claims to include water in the liquid state and in the state of vapor. Furthermore, the term "deuterium oxide" is used to include all such compounds of deuterium containing oxygen, which occur in water, for instance $D_2O$, $DHO$, etc., and the term "deuterium" is used to include $D_2$ and $DH$ (deuteriumhydride). By the term "cycle of said steps" there is meant in the following claims the succession of steps carried out either once or several times, which comprises producing hydrogen or compounds containing bound hydrogen, keeping the said hydrogen or compounds in contact with water for enriching the same with deuterium oxide, returning enriched water thus obtained into the step of producing hydrogen or compounds containing bound hydrogen, and keeping the hydrogen thus enriched with deuterium or the compounds containing bound hydrogen thus enriched with bound deuterium in contact with water for effecting enrichment thereof.

What I claim is:

1. A process for the production of water enriched with deuterium oxide comprising the steps of reducing water to hydrogen by the action of a chemical reducing agent in a first partial process, enriching water with deuterium oxide by contacting the thus produced hydrogen with water in a second partial process, introducing into the said first partial process at least part of the water thus enriched with deuterium oxide so as to reduce the said water enriched with deuterium oxide to hydrogen enriched with deuterium, contacting with water the thus produced hydrogen enriched with deuterium in the said second partial process, repeating the cycle of the said steps and removing and collecting the water enriched with deuterium oxide.

2. A process for the production of water enriched with deuterium oxide comprising the steps of reducing water to hydrogen by the action of a chemical reducing agent in a first partial process, enriching water with deuterium oxide by contacting the thus produced hydrogen with water in the presence of finely divided platinum in a second partial process, introducing into the said first partial process at least part of the water thus enriched with deuterium oxide so as to reduce the said water enriched with deuterium oxide to hydrogen enriched with deuterium, contacting with water the thus produced hydrogen enriched with deuterium in the presence of finely divided platinum in the said second partial process, repeating the cycle of the said steps and removing and collecting the water enriched with deuterium oxide.

3. A process for the production of water enriched with deuterium oxide comprising the steps of decomposing water with incandescent carbon in a first partial process to produce water gas comprising carbon monoxide, hydrogen and deuterium, contacting the thus produced water gas with water in the presence of a catalyser in a second partial process to establish the equilibria between hydrogen, deuterium, water and deuterium oxide, thus enriching water with deuterium oxide, introducing into the said first partial process at least part of the water thus enriched with deuterium oxide so as to decompose the said water enriched with deuterium oxide to produce water gas enriched with deuterium, contacting with water the water gas thus enriched with deuterium in the presence of a catalyser in the said second partial process, to establish the equilibria between hydrogen, deuterium, water and deuterium oxide, repeating the cycle of the said steps and removing and collecting the water enriched with deuterium oxide.

4. Process for the production of water enriched with deuterium oxide comprising catalytically converting a mixture comprising carbon monoxide and hydrogen with water vapor in excess over the stoichiometrically required amount in a first partial process to produce a convert gas comprising carbon dioxide, hydrogen and deuterium, contacting the hydrogen and deuterium in the converted gas in the presence of a catalyser with water in a second partial process to establish the equilibria between hydrogen, deuterium, water and deuterium oxide thus enriching the said water with deuterium oxide, introducing at least part of the water thus enriched with deuterium oxide into the said first partial process so as to obtain a convert gas enriched with deuterium, contacting the thus produced convert gas with water in the presence of a catalyser in the said second partial process to establish the equilibria between hydrogen, deuterium, water and deuterium oxide, repeating the cycle of the said steps and removing and collecting the water enriched with deuterium oxide.

5. Process for the production of water enriched wtih deuterium oxide, comprising the steps of producing water gas comprising carbon monoxide, hydrogen and deuterium, by decomposition of water with incandescent carbon, catalytically converting the thus obtained water gas with water vapor in excess over the stoichiometrically required amount to produce a convert gas containing carbon dioxide, hydrogen and deuterium, contacting the hydrogen and deuterium in the converted gas with water in the presence of a catalyser to establish the equilibria between hydrogen, deuterium, water and deuterium oxide, thus enriching the said water with deuterium oxide, introducing part of the water enriched with deuterium oxide into the stage of production of water gas and part of the water in the form of water vapor into the said converting stage of water gas, contacting with water in the presence of a catalyser the hydrogen and deuterium in the converted gas to establish the equilibria between hydrogen, deuterium, water and deuterium oxide, repeating the cycle of the said steps and removing and collecting the water enriched with deuterium oxide.

FRITZ HANSGIRG.